Feb. 5, 1952 — G. L. GRISDALE — 2,584,800
OVERLOAD PROTECTION DEVICE FOR ELECTRICAL INSTRUMENTS
Filed July 9, 1947
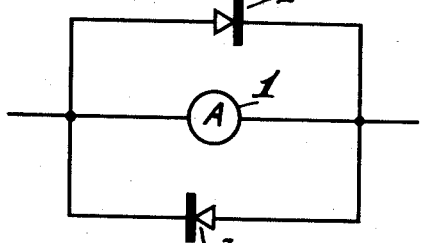
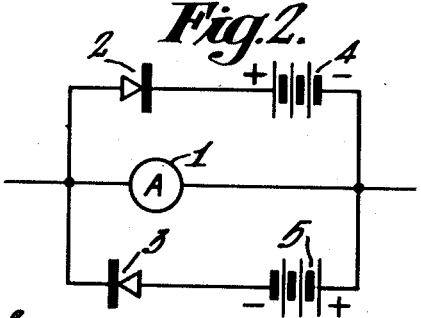
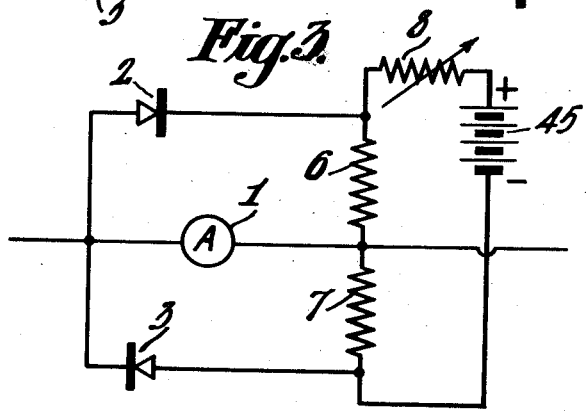
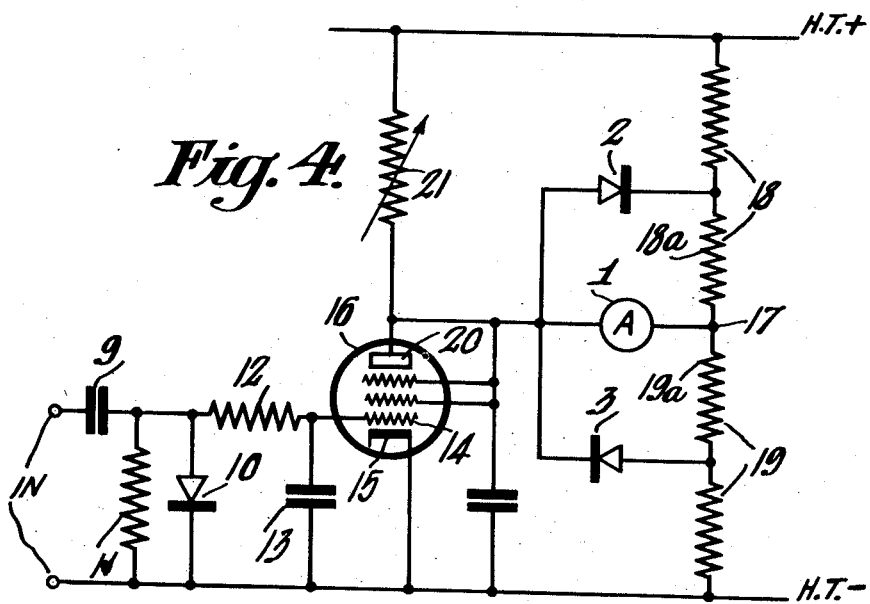
INVENTOR.
George Lambert Grisdale
BY Harry Tunick
ATTORNEY Patented Feb. 5, 1952

2,584,800

UNITED STATES PATENT OFFICE 2,584,800

OVERLOAD PROTECTION DEVICE FOR ELECTRICAL INSTRUMENTS

George Lambert Grisdale, Great Baddow, Chelmsford, England, assignor, by mesne assignments, to Radio Corporation of America, New York, N. Y., a corporation of Delaware Application July 9, 1947, Serial No. 759,856
In Great Britain July 10, 1946

3 Claims. (Cl. 171—95)

This invention relates to overload protecting circuit arrangements for instruments and other devices, and has for its object to provide improved overload protecting circuit arrangements of the kind wherein one or more shunt rectifiers are employed across the instrument circuit to protect it.

The invention is illustrated and explained in connection with the accompanying diagrammatic drawings.

Referring to Fig. 1, which shows a known arrangement of the kind referred to, an ammeter or other instrument 1 may be given a measure of protection against damage due to the occurrence of too high a voltage across it by connecting a rectifier (or preferably, as shown, two oppositely directed rectifiers 2, 3) across the meter so that as the voltage across the said meter instrument rises with increase in the current flow therethrough, a greater and greater proportion of current is taken by the rectifier or rectifiers due to the non-linear characteristics thereof. Of course, in such an arrangement the provision of the rectifier causes the law of the meter (if previously linear) to become, in effect, non-linear, but this is not as a rule an important defect and may even be advantageous in some cases.

The above described arrangement has, however, two disadvantages, namely, that the rectifier shunting effect produces decreased instrumental sensitivity over the useful range thereof, while inadequate protection is provided in the overload range owing to the large value of the rectifier resistance when the current is relatively small.

The principal object of the present invention is to avoid these defects.

According to this invention, an instrument or other device to be protected against overload has connected in parallel therewith, or there is connected in parallel with a circuit including said instrument, a rectifier in series with a potential source of predetermined and, if desired, adjustable value, whereby a so-called delay voltage is provided for the rectifier causing it to be ineffective until the delay voltage (or voltages) is exceeded.

Fig. 2 shows one embodiment of the invention. Here a circuit comprising an alternating current milliammeter 1 has connected in parallel therewith two additional circuits oppositely polarized and each consisting of a rectifier 2 or 3 in series with a delay voltage source 4 or 5. If the delay voltage of each source is made substantially equal to the voltage drop which occurs across the instrument when a current corresponding to the maximum of its intended working range flows therethrough, the instrument will be quite unaffected by the presence of the shunting rectifier circuits over the said working range. However, when the working range is exceeded, the rectifier circuits commence to pass current and thereby protect the meter. Accordingly over the working range of the instrument its sensitivity is not affected, while in the overload range (i. e., beyond the said working range) considerably improved protection is provided.

Each delay voltage source may take any of a variety of different forms, such as a battery, or a battery and associated potentiometer. If desired, a common battery may be used to provide two delay voltages, one for each rectifier where two rectifiers are used. In one arrangement of this nature shown in Fig. 3, the instrument 1 is shunted by two circuits each consisting of an oppositely directed rectifier 2 or 3 in series with a resistance 6 or 7, these two resistances being themselves in series across a circuit comprising a battery 45 and an adjustable series resistance 8.

The invention is of wide application, but one practical advantageous application will be described by way of example with reference to Fig. 4. This application is to a bridge indicating signal measuring circuit, wherein an alternating voltage constituting the signal to be measured or indicated is applied at "In" through a condenser 9, to a rectifying and smoothing circuit including a rectifier 10, resistances 11, 12, and condenser 13, to produce a resultant which is applied between control grid 14 and cathode 15 of a thermionic tube 16 whose internal impedance constitutes one arm of a Wheatstone bridge which is balanced in the absence of an input signal. The measuring instrument 1 to be protected is included in a diagonal of the bridge, said diagonal extending between the junction point 17 of two bridge resistances 18, 19 which are in series across the anode potential source (not shown) and the junction point of the anode 20, with the third bridge resistance 21 (adjustable) connected between said anode and the positive terminal of the anode potential source. In such a circuit the sudden application of a large signal to the tube may cause a large out-of-balance voltage, with real danger to the instrument. In applying the present invention to the protection of the said instrument, there is provided in shunt therewith two branch circuits each consisting of an oppositely directed rectifier 2 or 3 in series with a portion 18a or 19a of one or the other of the two bridge resistances designated as a whole by 18 or 19. By virtue of the flow of current from the high tension source through the two resistance portions 18a, 19a mentioned, the said portions act as delay voltage sources. If desired, the rectifiers may be variably tapped on the bridge resistances 18, 19 to which they are respectively connected so that the said resistance portions, and therefore the delay voltages, are adjustable.

What is claimed is:

1. An overload protection circuit for an electrical measuring instrument, comprising a bridge circuit having four arms, one arm of said bridge being constituted by the internal impedance of an electron flow device, a measuring instrument to be protected connected across one diagonal of said bridge circuit, a source of potential for said device connected across the other diagonal of said bridge, a plurality of series resistors in each of the second and third arms of said bridge circuit, a variable resistance in the fourth arm of said circuit, and two branch circuits connected in shunt with said instrument, one of said branch circuits including in series a rectifier and one of the resistors in said second arm and the other branch circuit including in series another rectifier and one of the resistors in said third arm, said two rectifiers being oppositely poled.

2. An overload protection circuit for an electrical measuring instrument, comprising a first rectifier connected in series with a first resistor, means connecting the free ends of the rectifier-resistor series combination to respective opposite sides of the instrument to be protected, a second rectifier connected in series with a second resistor, means connecting the free ends of the second rectifier-resistor series combination to respective opposite sides of said instrument, said first and second rectifiers being oppositely poled, means for applying unidirectional potential to said first and second resistors in series with each other, said last-named means including means for adjusting said potential to make the voltage drop across each of said resistors substantially equal to the voltage drop across the instrument produced by the maximum intended current flow therethrough.

3. A circuit as defined in claim 2, wherein said adjusting means comprises a variable resistor connected in series with the first and second resistors.

GEORGE LAMBERT GRISDALE.

REFERENCES CITED

The following references are of record in the file of this patent:

UNITED STATES PATENTS

| Number | Name | Date |
|---|---|---|
| 1,929,216 | Pfannemuller | Oct. 3, 1933 |
| 1,964,141 | Rhodes et al. | June 26, 1934 |
| 2,079,485 | Bousman | May 4, 1937 |
| 2,368,351 | Ewen | Jan. 30, 1945 |
| 2,419,292 | Shepard | Apr. 22, 1947 |